(12) United States Patent
Wu

(10) Patent No.: US 7,077,421 B2
(45) Date of Patent: Jul. 18, 2006

(54) TABLE SAW CART

(75) Inventor: San-Ching Wu, Taipei County (TW)

(73) Assignee: Super Made Products Co., Ltd., Taipei (TW)

( * ) Notice: Subject to any disclaimer, the term of this patent is extended or adjusted under 35 U.S.C. 154(b) by 24 days.

(21) Appl. No.: 10/948,233

(22) Filed: Sep. 24, 2004

(65) Prior Publication Data

US 2006/0071450 A1   Apr. 6, 2006

(51) Int. Cl.
B62B 1/04 (2006.01)

(52) U.S. Cl. ............... 280/645; 280/30; 280/47.27; 280/47.18

(58) Field of Classification Search ............... 280/645, 280/651, 652, 30, 47.27, 47.29, 47.18, 47.28; 269/17; 182/20
See application file for complete search history.

(56) References Cited

U.S. PATENT DOCUMENTS

| | | | |
|---|---|---|---|
| 5,154,441 A * | 10/1992 | White et al. | 280/645 |
| 5,863,052 A * | 1/1999 | Roman | 280/30 |
| 6,530,583 B1 * | 3/2003 | Mueller | 280/47.18 |
| 6,588,775 B1 * | 7/2003 | Malone, Jr. | 280/47.18 |
| 6,886,836 B1 * | 5/2005 | Wise | 280/30 |
| 2003/0047895 A1 * | 3/2003 | McElroy | 280/79.3 |
| 2003/0062700 A1 * | 4/2003 | Stallbaumer | 280/47.27 |
| 2004/0140638 A1 * | 7/2004 | Celli | 280/47.18 |
| 2005/0093258 A1 * | 5/2005 | Brazell et al. | 280/30 |

* cited by examiner

Primary Examiner—J. Allen Shriver

(57) ABSTRACT

A table saw cart including a carrier, a foldable frame, and a pair of wheels; a stretcher between wheels; a connection rod between the stretcher and rear legs of the foldable frame. The wheels are raised above the floor by the stretcher to prevent displacement of cart while the machine thereon is operating. Two extension rods extend from the open end of carrier to secure the cart with the wheels. Both rear legs define a handle; and a pull rod and three locking pins control the elevation of the cart to secure the cart in either of a folded positioned or a raised, standing position.

8 Claims, 8 Drawing Sheets

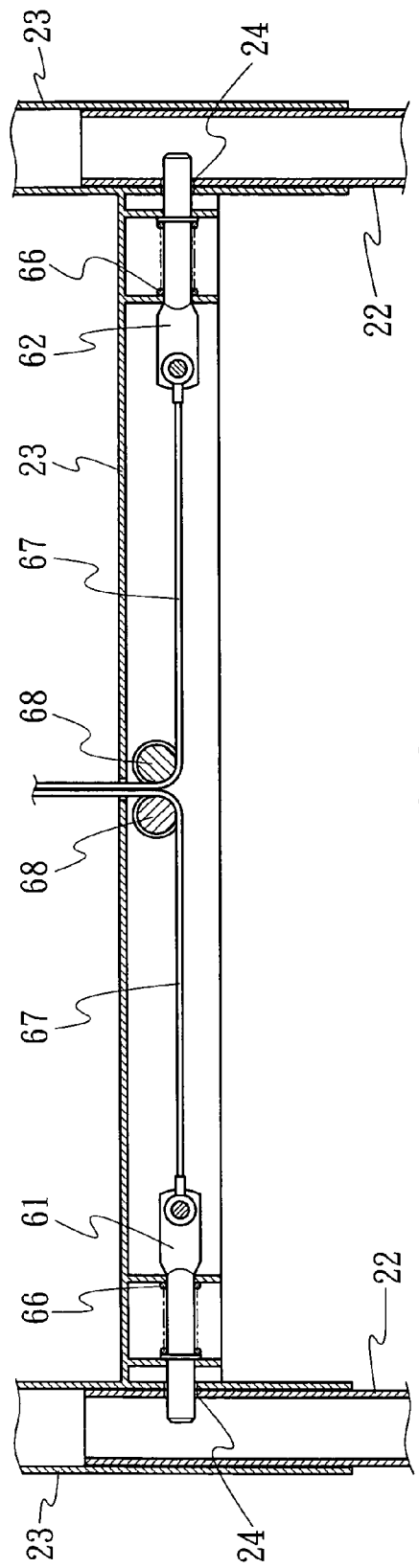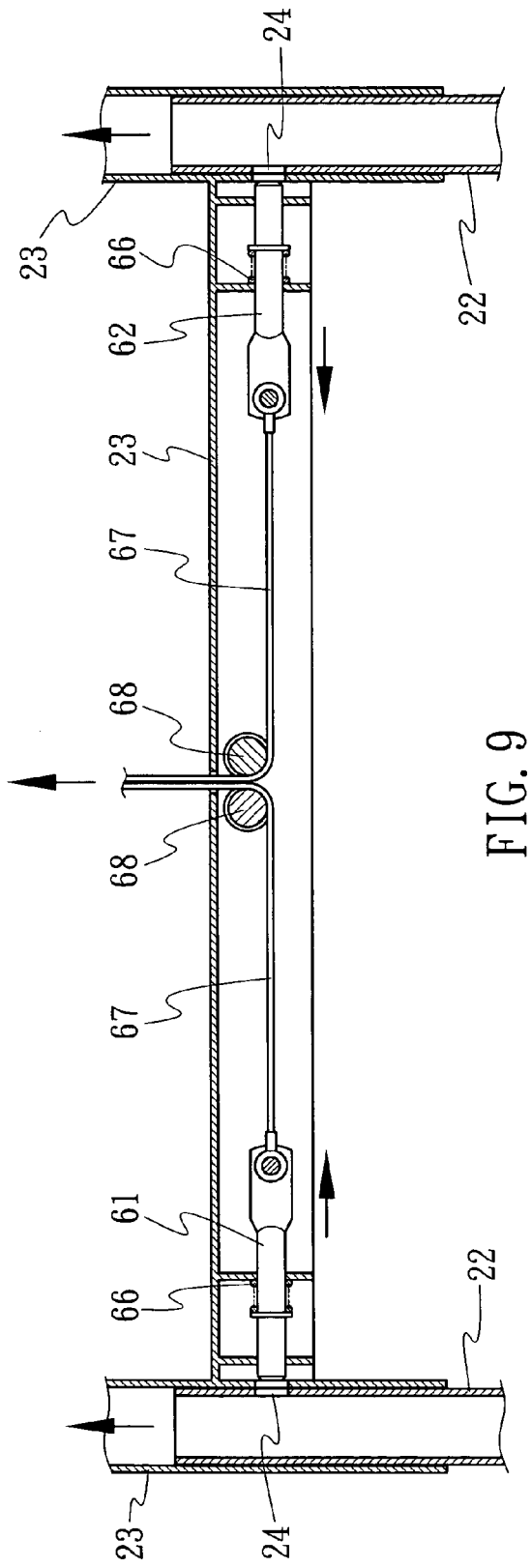

US 7,077,421 B2

1

TABLE SAW CART

BACKGROUND OF THE INVENTION (a) Field of the Invention

The present invention is related to a table saw cart, and more particularly, to one that carries a sawing machine or similar machine.

(b) Description of the Prior Art

A table saw cart of the prior art for carrying a sawing machine or similar machine as taught in U.S. Pat. Nos. 6,722,618 and 6,314,893 provides a cart exclusively designed for carrying the sawing machine or similar machine to operate thereon and is adapted with foldable frame legs. However, no safety positioning means is provided to the prior art resulting in displacement of the cart due to the strong vibration from the machine while operating. Therefore, the prior art is vulnerable to operating problems and safety concerns.

SUMMARY OF THE INVENTION

The primary purpose of the present invention is to provide a table saw cart that prevents displacement of the cart while the machine it carries is operating. To achieve the purpose, a stretcher is provided to the wheels to automatically elevate the cart with its wheels clear of the floor to increase the friction between the cart and the floor for optimal positioning of the cart when the cart is raised to a standing position as the machine is operating.

Another purpose of the present invention is to provide a table saw cart that secures a machine, e.g., a sawing machine, with a higher central gravity in position when erected on the cart. To achieve the purpose, an extension rod is each adapted to both sides of the front end of a carrier of the cart so to support the cart in conjunction with the wheels when the cart is erected.

Another purpose yet of the present invention is to provide a table saw cart that allows wider working range. To achieve the purpose, the rear legs of a foldable frame of the cart are made in a form of handle to push around the cart as desired with the least efforts.

Another purpose yet of the present invention is to provide a machine cart that secures the cart in position whether the cart is stretched out or folded in. To achieve the purpose, a control pull rod that controls three locking pins at the same time is provided to easily complete the elevation of the cart.

2

FIG. 8 is a schematic view showing that the present invention is secured in position by having two locking pins to penetrate through the rear legs and retractable tubes.

FIG. 9 is a schematic view showing that the locking status illustrated in FIG. 8 is released.

Figure 10:
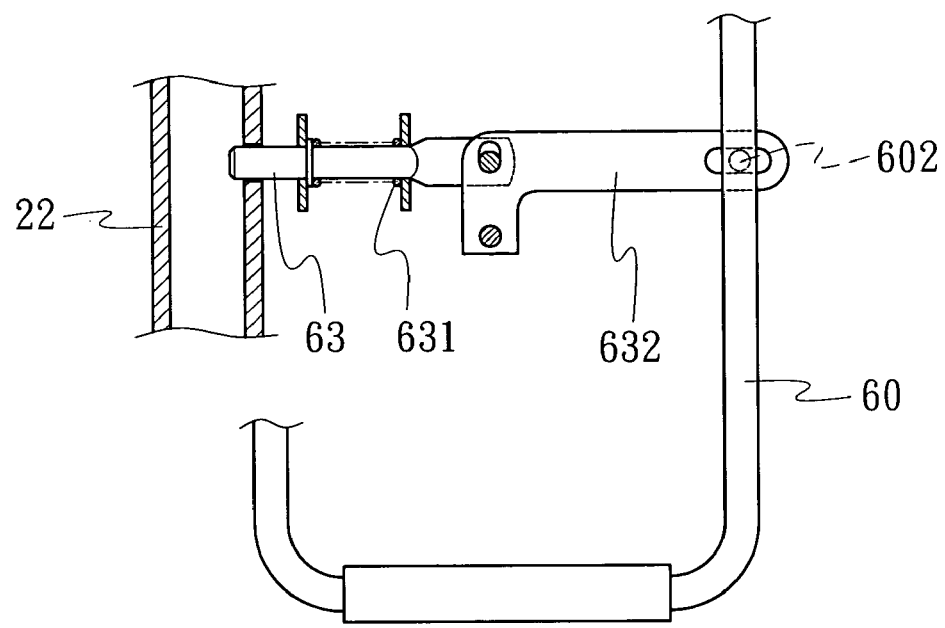

FIG. 10 is a schematic view showing that the present invention is secured in position by having a third locking pin to lock up the rear legs.

Figure 11:
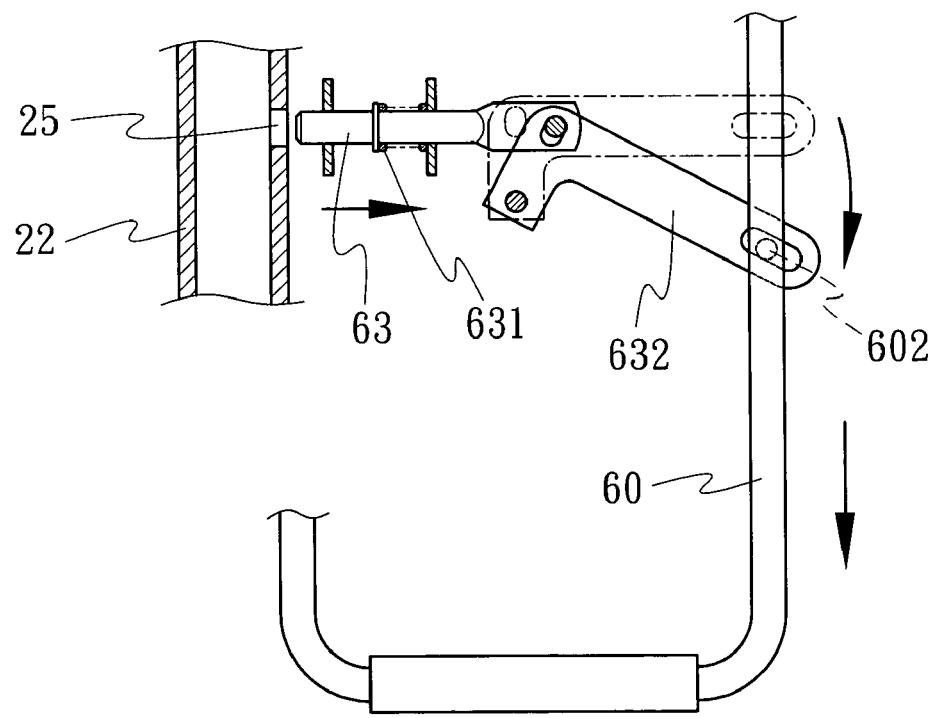

FIG. 11 is a schematic view showing that the locking status illustrated in FIG. 10 is released.

DETAILED DESCRIPTION OF THE PREFERRED EMBODIMENTS

Referring to FIGS. 1 through 4, a preferred embodiment of the present invention, a table saw cart is essentially comprised of a carrier 10, a foldable frame 20 and a pair of wheels 30. Wherein, the carrier 10 related to a U-shaped frame provided on the upper end of the foldable frame 20 secures a machine 50 (e.g., a sawing machine or similar machine) and has an rod 101 extending upwardly from both open ends of the carrier 10.

Figure 5:
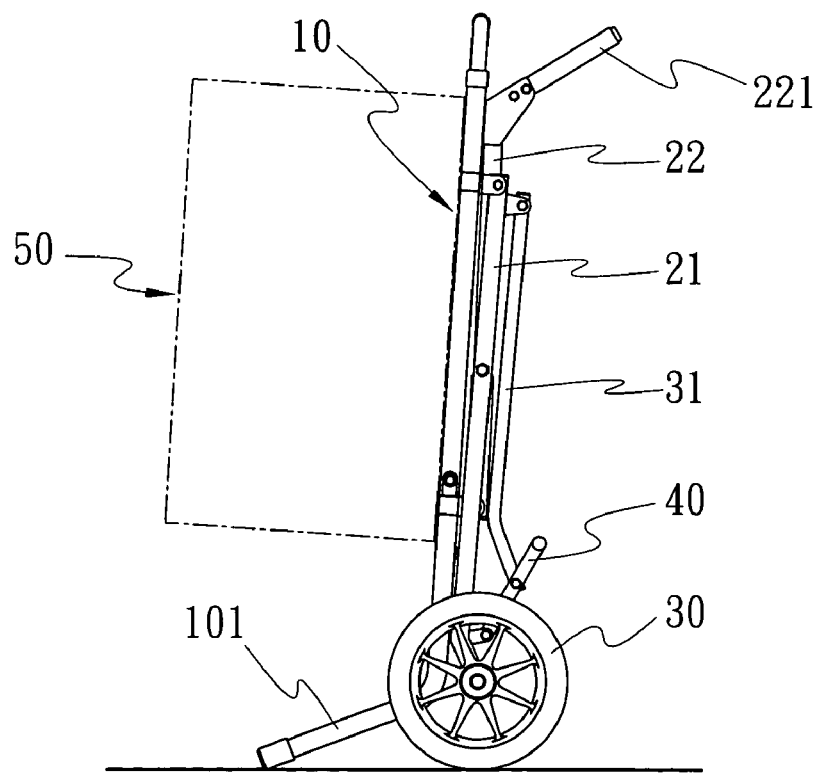
FIG. 5 is a schematic view showing that the folded present invention is left in standing position.

The foldable frame 20 is a cross frame with its upper end fixed to the carrier 10. The foldable frame 20 comprises a pair of front legs 21 and a pair of rear legs 22; both rear legs 22 are each movably coupled to a retractable tube member 23 with the terminal end 221 of each rear leg 22 curved downward so that when the cart is left in a standing position, both terminal ends 221 define a handle to push the cart as illustrated in FIG. 5. Furthermore, a pressure rod 201 is connected at a selected location between the carrier 10 and the foldable frame 20 to serve as a buffer in elevation and folding in of the foldable frame 20. The foldable frame 20 is movable between a first position wherein the cart is raised into a standing position and a second position wherein the cart is collapsed into a folded position.

Both extension rods 101 provided to the open ends of the carrier 10 and both wheels 30 support the cart in position when the cart is standing alone as illustrated in FIG. 5 so that the machine 50 with a higher central gravity is firmly secured to the carrier 10; meanwhile, both terminals 221 from the pair of the rear legs 22 function as a handle to push the cart.

Figure 1:
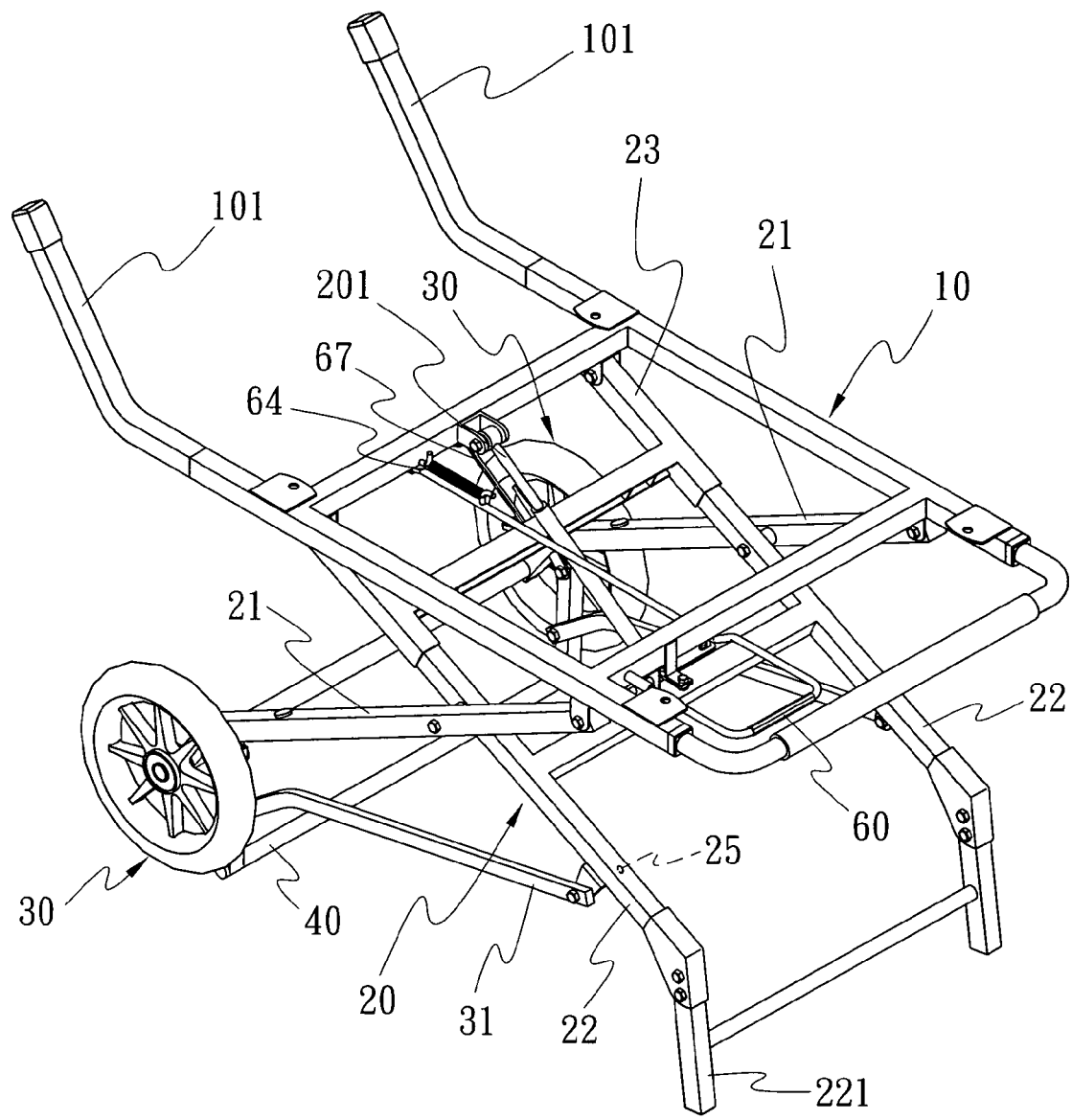
FIG. 1 is a perspective view of an assembly of the present invention.
Figure 2:
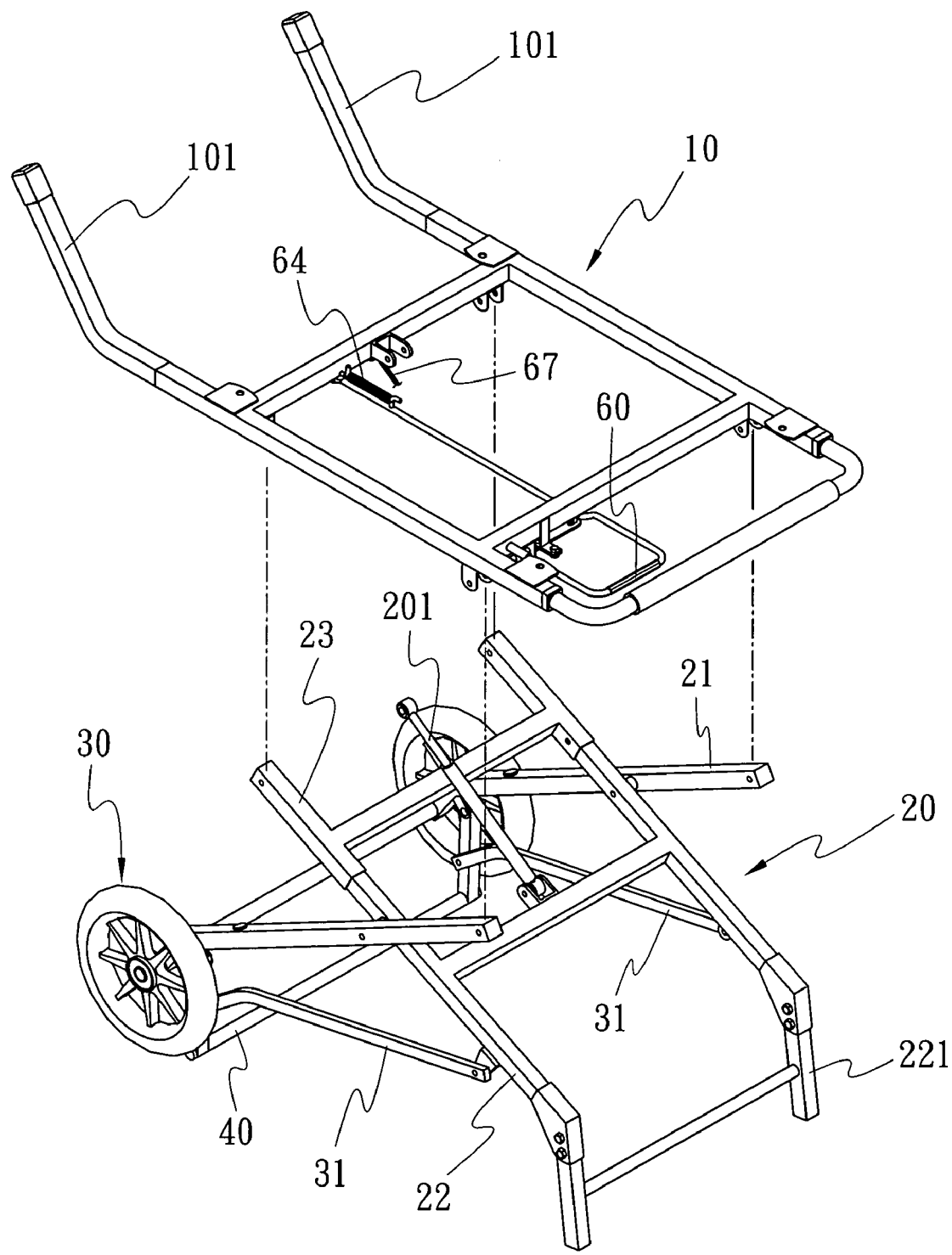
FIG. 2 is an exploded view showing that a carrier of present invention is in separated status.
Figure 3:
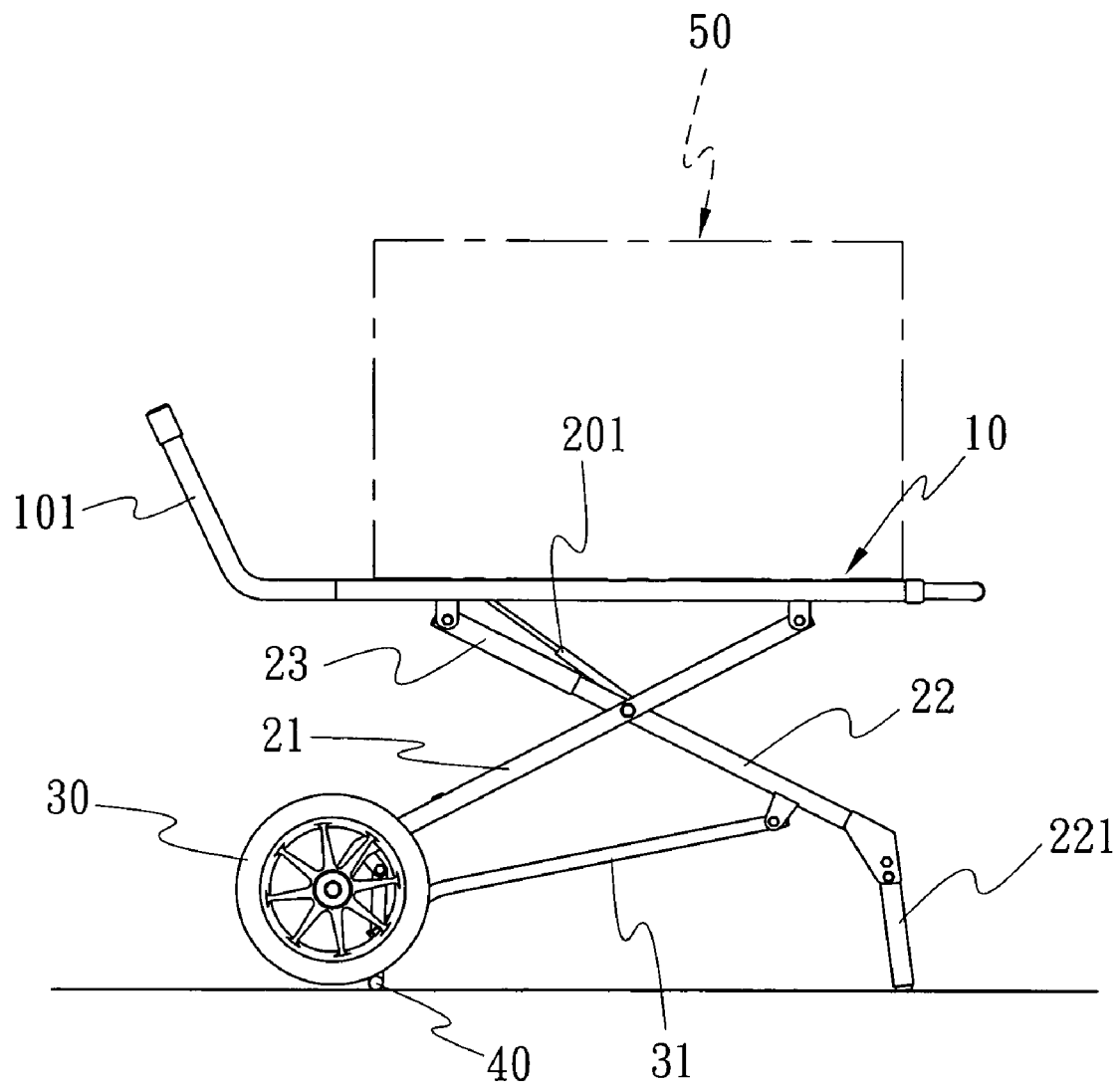
FIG. 3 is a schematic view showing that the wheels of the present invention is stretched and elevated off the ground by a stretcher.
Figure 4:
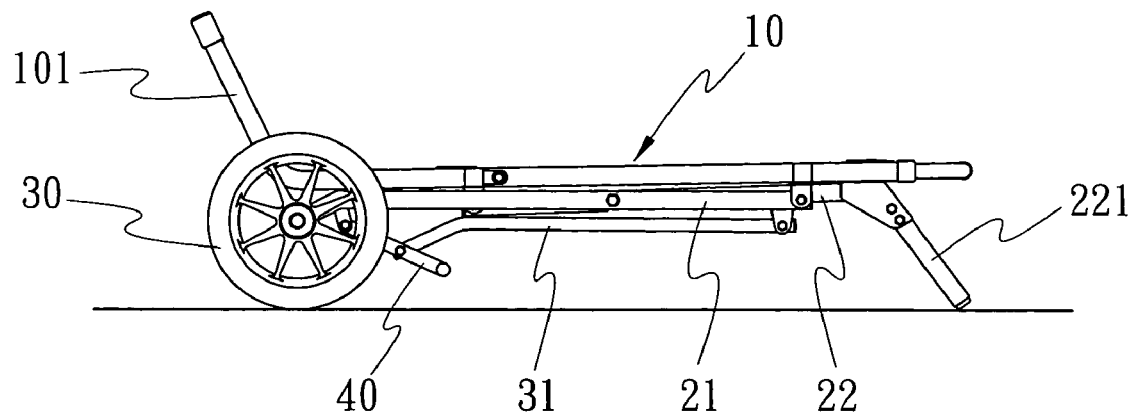
FIG. 4 is a schematic view showing that the folded present invention is laid flat.

The pair of wheels 30 are provided at the bottom of both front legs 21 of the foldable frame 20. A stretcher 40 is pivotally connected between both wheels 30. A connection rod 31 is provided between the stretcher 40 and each rear leg 22 of the foldable frame 20. Accordingly, when the cart is raised into the standing position and the machine 50 on the carrier 10 is operating, both wheels 30 are elevated by the stretcher 40 above the floor as illustrated in FIG. 3 to provide extremely great friction for the cart since the stretcher 40 directly contacts the floor. The cart will be free of displacement even in the presence of strong vibration from the machine 50 in operation.

Figure 6:
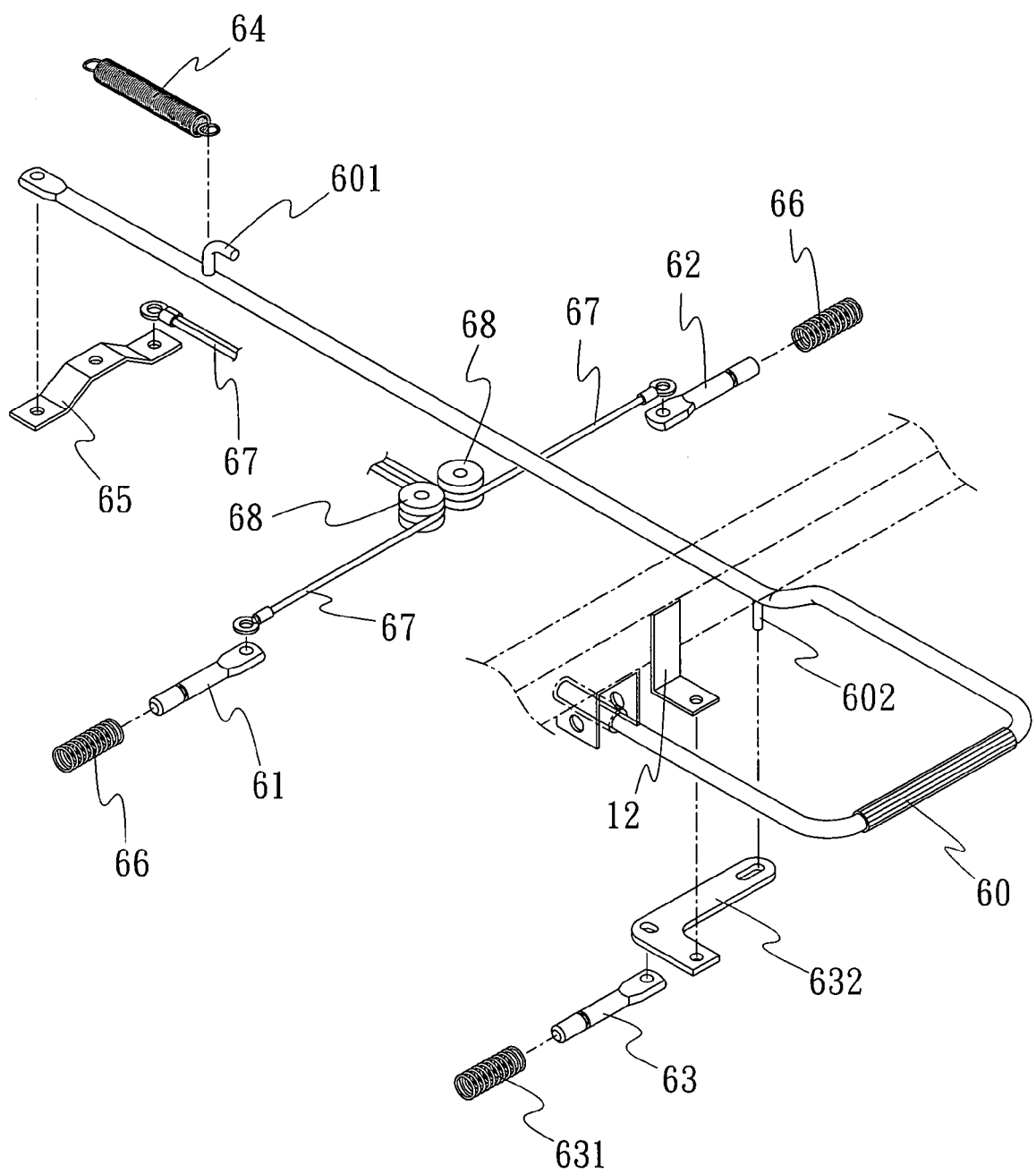
FIG. 6 is an exploded view of a subassembly of a control pull rod of the present invention.
Figure 7:
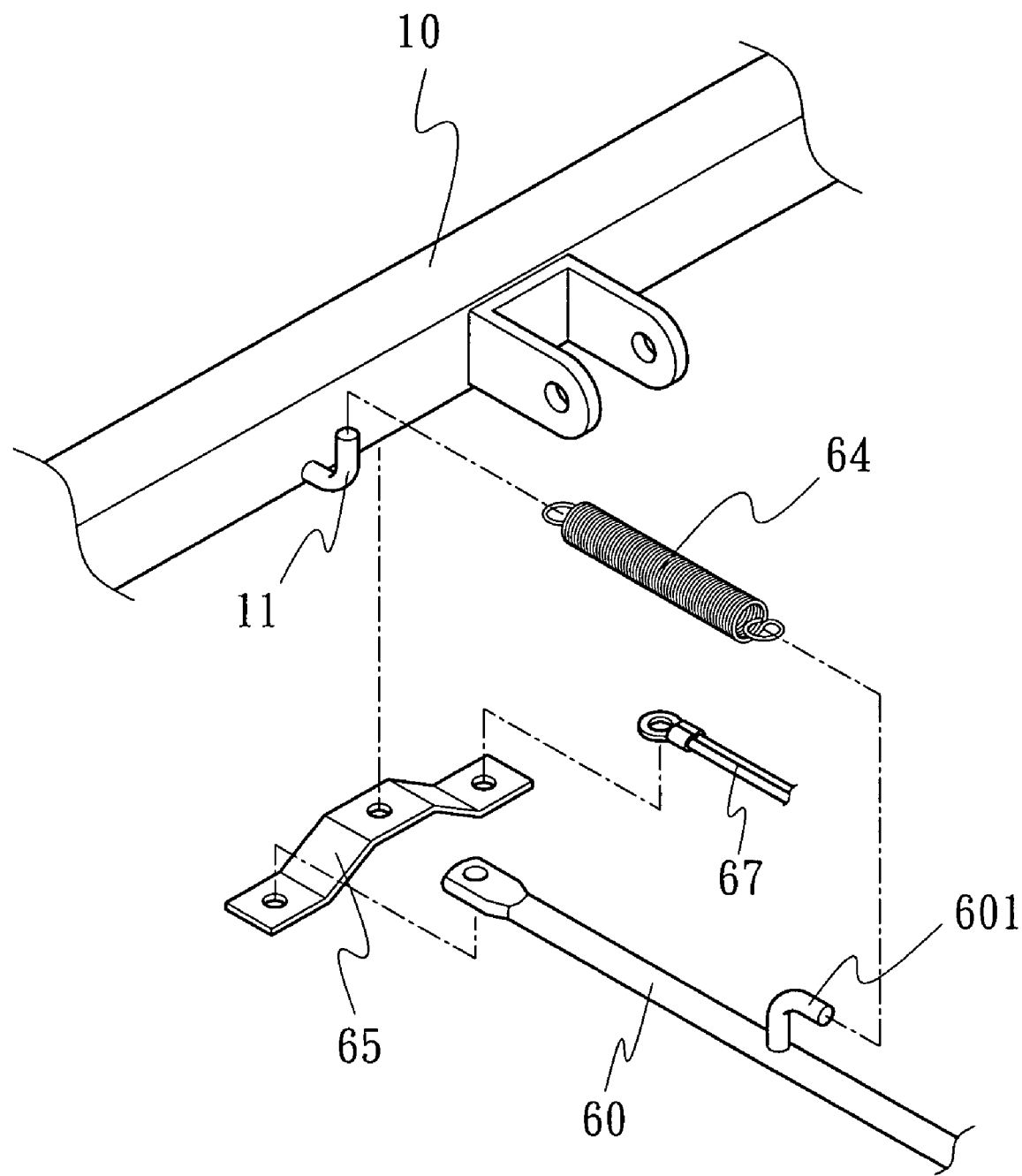
FIG. 7 is an exploded view showing a local part of the terminal of the control pull rod connected to a carrier.

Now referring to FIG. 6, a pull rod 60 provided to the carrier 10 controls three locking pins 61, 62, and 63 at the same time to firmly secure the cart in its standing or folded positions. The pull rod 60 is related to a mobile rod provided to the frame of the carrier 10 as illustrated in FIG. 7. One end of the pull rod 60 extends to the other end of the carrier 10 to connect to a tension spring 64 and locked to a pull plate 65 so that when the pull rod 60 is pulled, it drives the pull plate 65 to be biased. Both locking pins 61, 62, laterally disposed and corresponding to each other, are concealed in both ends of the retractable tube 23 of the carrier 10. When extended, both locking pins 61, 62 penetrate through both rear legs 22 and two pinholes 24 of the retractable tube 23 to lock in place as illustrated in FIG. 8 and when disengaged, the locking status is released as illustrated in FIG. 9 for the cart to be folded in. Two return springs 66 are each inserted to the front ends; and two cables 67 are connected at the rear ends of both locking pins 61, 62. Each cable 67 passes through a turning gear 68 to be locked to the pull plate 65 disposed at the terminal end of the pull rod 60. Accordingly, once the pull rod 60 is pulled, the pull plate 65 is biased; both cables 67 in turn are pulled to draw both locking pins 61, 62 to be disengaged from both pinholes 24 to automatically descend and fold in the foldable frame 20. On the contrary, when the foldable frame 20 is raised, both locking pins 61, 62 are inserted into both pinholes 24 to secure the foldable frame 20 in its standing position.

Both ends of the tension spring 64 are respectively hooked to two hooks 11, 601 provided on the carrier 10 and the pull rod 60 while the pull plate 65 is movably pivoted to the lower end of the carrier 10 as illustrated in FIG. 7 with one end connected to the terminal of the pull rod 60 and the other end connected to the cable 67.

The third locking pin 63 adapted to a pinhole 25 at the rear leg 22 as illustrated in FIGS. 6, 10 and 11 has its front end inserted with a return spring 631 and its rear end incorporated to a second pull plate 632. One end of the second pull plate 632 is pivoted to a locking plate 12 disposed at the carrier 10 and the other end is locked to a pillar 602 adapted to the pull rod 60 or elsewhere as appropriately. Accordingly, when the pull rod 60 is pulled, the second pull plate 632 is biased to pull the locking pin 63 to clear out of the pinhole 25 for automatically stretching up the foldable frame 20 from its folded position. On the contrary, to fold in the foldable frame 20, the locking pin 63 inserted into the pinhole 25 of the rear leg 22 to restrict the cart in secured status.

By means of the pull rod 60 to control those three locking pins 61, 62 and 63 at the same time, the table saw cart is firmly secured in position either in its stretched up or folded in status. However, it is to be noted that the configuration of the pull rod 60 and three locking pins 61, 62 and 63 disclosed in the specification and the accompanying drawings relate to only a preferred embodiment of the present invention without limiting the art of the present invention. Therefore, any equivalent effect or any summary change or replacement of the art of the present invention shall be deemed as falling within the scope of the purposes and claims of the present invention.

What is claimed is:

1. A table saw cart comprising:
   a carrier, a foldable frame and a pair of wheels;
   wherein the carrier is provided on an upper end of the foldable frame; the foldable frame includes a pair of front legs and a pair of rear legs; the pair of wheels are provided at a bottom of the front legs of the foldable frame; the rear legs are movably coupled to a retractable tube member attached to said carrier; a stretcher is pivotally connected between both wheels; and at least one connection rod is provided between the stretcher and the rear legs of the foldable frame;
   wherein the foldable frame is movable between a first position in which the cart is raised into a standing position and a second position in which the cart is collapsed in a folded position; and
   wherein the stretcher is moved into a position to support the cart with the wheels raised above an underlying floor when the cart is raised into said standing position.

2. The table saw cart of claim 1, wherein, two extension rods respectively extend from open ends of the carrier to hold the table saw cart in position when the table saw cart is raised into said standing position.

3. The table saw cart of claim 1, wherein, a terminal end of the rear legs of the foldable frame are curved downward to define a handle for pushing the table saw cart in said standing position.

4. The table saw cart of claim 1, wherein, a pressure rod is provided between the foldable frame and the carrier.

5. The table saw cart of claim 1, wherein a pull rod is adapted to the carrier to control three locking pins at the same time for securing the table saw cart in either of said standing or folded positions.

6. The table saw cart of claim 5, wherein, the pull rod is coupled to the carrier, the pull rod having a first end coupled to a first end of the carrier by a pull plate; the pull plate being engaged to two cables respectively passing through a turning gear and engaged with two of said locking pins laterally corresponding to each other; and the pull plate being biased by a tension spring to position said pull rod in a first position wherein said two of said locking pins penetrate into said pinholes provided respectively on the rear legs and the retractable tube member;
   wherein pulling said pull rod into a second position draws said two of said locking pins clear of said pinholes.

7. The table saw cart of claim 6, wherein said two of said locking pins are concealed in both ends respectively of the retractable tube member of the carrier.

8. The table saw cart of claim 5, wherein, the a third of said locking pins is adapted to penetrate a pinhole on one of the rear legs; a return spring is inserted into a front end of the locking pin; a second pull plate is engaged with a rear end of the locking pin;
   wherein one end of the second pull plate is pivoted to the carrier, the other end of the second pull plate is engaged to the pull rod, and the second pull plate is driven by the pull rod to cause the locking pin to disengage from the pinhole to automatically raise the table saw cart from said folded position into said standing position.

\* \* \* \* \*